US011086991B2

(12) United States Patent
Yao et al.

(10) Patent No.: US 11,086,991 B2
(45) Date of Patent: Aug. 10, 2021

(54) METHOD AND SYSTEM FOR ACTIVE RISK CONTROL BASED ON INTELLIGENT INTERACTION

(71) Applicant: ADVANCED NEW TECHNOLOGIES CO., LTD., Grand Cayman (KY)

(72) Inventors: Lei Yao, Hangzhou (CN); Yifeng Ying, Hangzhou (CN); Na Li, Hangzhou (CN); Zhe Zhang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/820,884

(22) Filed: Mar. 17, 2020

(65) Prior Publication Data

US 2020/0233958 A1   Jul. 23, 2020

Related U.S. Application Data

(63) Continuation of application No. PCT/CN2020/071590, filed on Jan. 11, 2020.

(30) Foreign Application Priority Data

Aug. 7, 2019 (CN) .......................... 201910726858.9

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ........ G06F 40/30; G06F 21/64; G06F 21/554; G06F 2221/034; H04L 51/12;
(Continued)

(56) References Cited

U.S. PATENT DOCUMENTS

| 6,957,199 B1 | 10/2005 | Fisher |
| 7,308,388 B2 | 12/2007 | Beverina et al. |

(Continued)

FOREIGN PATENT DOCUMENTS

| CN | 106970911 A | 7/2017 |
| CN | 107147621 A | 9/2017 |

(Continued)

OTHER PUBLICATIONS

Written Opinion and International Search Report for PCT Application No. PCT/CN2020/071590 made available to public dated Feb. 11, 2021.

(Continued)

*Primary Examiner* — Shahriar Zarrineh

(57) ABSTRACT

A method for active risk control based on an intelligent interaction comprises: acquiring contact information of a risk implementer; actively interacting with the risk implementer based on the contact information of the risk implementer and generating a record of the active interaction; processing the record of the active interaction and extracting risk characteristics from it; categorizing risks according to the risk characteristics; and implementing different risk controls on the risks.

20 Claims, 8 Drawing Sheets

(58) Field of Classification Search
CPC ... H04L 63/145; H04L 63/1408; H04L 51/04; H04L 63/30
USPC .......................................................... 726/22
See application file for complete search history.

(56) References Cited

U.S. PATENT DOCUMENTS

| | | | |
|---|---|---|---|
| 7,412,721 B2* | 8/2008 | Torii | H04L 63/1416 726/22 |
| 7,665,134 B1* | 2/2010 | Hernacki | G06F 21/55 726/22 |
| 8,099,760 B2 | 1/2012 | Cohen et al. | |
| 8,336,079 B2 | 12/2012 | Budko et al. | |
| 8,429,545 B2* | 4/2013 | Dixon | G06Q 10/06 715/760 |
| 8,539,586 B2 | 9/2013 | Stephenson | |
| 8,688,478 B2 | 4/2014 | Bredl et al. | |
| 8,719,938 B2* | 5/2014 | Chasko | H04L 63/06 726/23 |
| 8,819,825 B2* | 8/2014 | Keromytis | H04L 63/1408 726/24 |
| 8,904,521 B2* | 12/2014 | Schneider | H04L 63/168 726/22 |
| 8,918,866 B2* | 12/2014 | Luo | H04L 63/20 726/22 |
| 8,943,588 B1* | 1/2015 | Speegle | H04L 63/1483 726/22 |
| 9,185,095 B1* | 11/2015 | Moritz | H04L 63/102 |
| 9,628,501 B2 | 4/2017 | Datta Ray et al. | |
| 9,756,075 B1* | 9/2017 | Gopalakrishna | H04L 63/1491 |
| 9,836,612 B2* | 12/2017 | Li | G06F 21/60 |
| 9,912,695 B1* | 3/2018 | Chao | H04L 63/1425 |
| 10,026,049 B2 | 7/2018 | Asenjo et al. | |
| 10,347,293 B1* | 7/2019 | Skinner | G06K 9/6202 |
| 10,348,763 B2* | 7/2019 | Gopalakrishna | H04L 63/1433 |
| 10,394,907 B2* | 8/2019 | Huang | G06F 16/1748 |
| 10,645,224 B2* | 5/2020 | Dwyer | G06F 40/279 |
| 2005/0141486 A1* | 6/2005 | Gilchrist | H04L 51/04 370/352 |
| 2005/0197952 A1 | 9/2005 | Shea et al. | |
| 2006/0075099 A1* | 4/2006 | Pearson | H04L 51/12 709/225 |
| 2006/0242701 A1* | 10/2006 | Black | H04L 63/1491 726/22 |
| 2006/0242704 A1* | 10/2006 | Aviani | G06F 21/56 726/23 |
| 2008/0168135 A1* | 7/2008 | Redlich | G06F 21/6218 709/204 |
| 2009/0182872 A1* | 7/2009 | Hong | H04L 67/38 709/224 |
| 2009/0300774 A1* | 12/2009 | Makkinejad | G06F 21/629 726/27 |
| 2011/0060733 A1* | 3/2011 | Peng | G06F 16/9535 707/723 |
| 2011/0286026 A1* | 11/2011 | Matsuzawa | G06F 3/1222 358/1.14 |
| 2012/0137363 A1* | 5/2012 | Meliksetian | G06F 21/00 726/22 |
| 2012/0167207 A1* | 6/2012 | Beckley | H04W 4/029 726/22 |
| 2012/0215575 A1 | 8/2012 | Deb et al. | |
| 2012/0278737 A1 | 11/2012 | Frayman et al. | |
| 2013/0097701 A1* | 4/2013 | Moyle | H04L 63/20 726/22 |
| 2013/0242743 A1* | 9/2013 | Thomas | H04L 45/306 370/236 |
| 2014/0090066 A1 | 3/2014 | Li et al. | |
| 2014/0137257 A1* | 5/2014 | Martinez | H04L 63/1433 726/25 |
| 2014/0143010 A1 | 5/2014 | Lawless et al. | |
| 2015/0067841 A1* | 3/2015 | Xu | H04L 63/1475 726/22 |
| 2015/0188941 A1* | 7/2015 | Boshmaf | H04L 63/1441 726/22 |
| 2016/0112450 A1 | 4/2016 | Basavapatna et al. | |
| 2016/0127931 A1* | 5/2016 | Baxley | G01S 5/0263 455/67.16 |
| 2016/0309032 A1* | 10/2016 | Patel | H04M 3/5166 |
| 2016/0330219 A1 | 11/2016 | Hasan | |
| 2016/0359905 A1* | 12/2016 | Touboul | H04L 63/1441 |
| 2017/0070521 A1* | 3/2017 | Bailey | G06F 21/316 |
| 2017/0111506 A1* | 4/2017 | Strong | G06F 21/32 |
| 2017/0134423 A1* | 5/2017 | Sysman | G06F 21/554 |
| 2017/0142046 A1* | 5/2017 | Abou Mahmoud | H04L 51/12 |
| 2017/0147817 A1* | 5/2017 | Yamane | G06F 11/3037 |
| 2017/0214708 A1* | 7/2017 | Gukal | G06F 16/285 |
| 2017/0286653 A1 | 10/2017 | Moore | |
| 2017/0300472 A1* | 10/2017 | Parikh | G06F 40/274 |
| 2018/0027006 A1 | 1/2018 | Zimmermann et al. | |
| 2018/0101576 A1* | 4/2018 | Lin | H04L 67/306 |
| 2018/0190274 A1* | 7/2018 | Kirazci | G10L 15/1815 |
| 2018/0285340 A1* | 10/2018 | Murphy | G06F 40/226 |
| 2018/0285343 A1* | 10/2018 | Chen | G06F 40/30 |
| 2019/0020676 A1* | 1/2019 | Laughlin | H04L 63/1441 |
| 2019/0037081 A1* | 1/2019 | Rao | H04L 41/08 |
| 2019/0114321 A1* | 4/2019 | Lam | G06F 40/284 |
| 2019/0199748 A1* | 6/2019 | Gopalakrishna | G06F 21/566 |
| 2019/0205926 A1* | 7/2019 | Qiu | H04L 63/1441 |
| 2019/0312869 A1* | 10/2019 | Han | G06F 16/9024 |
| 2019/0347429 A1* | 11/2019 | Jean-Louis | G06F 21/602 |
| 2020/0065384 A1* | 2/2020 | Costello | G06N 3/04 |
| 2020/0067861 A1* | 2/2020 | Leddy | H04L 51/12 |
| 2020/0183820 A1* | 6/2020 | Hebert | G06F 8/10 |

FOREIGN PATENT DOCUMENTS

| | | |
|---|---|---|
| CN | 108989581 A | 12/2018 |
| CN | 109146670 A | 1/2019 |
| CN | 109255697 A | 1/2019 |
| CN | 110046902 A | 7/2019 |
| CN | 110598982 A | 12/2019 |
| TW | M557407 U | 3/2018 |
| TW | M577148 U | 4/2019 |

OTHER PUBLICATIONS

First Search for Chinese Application No. 201910726858.9 dated May 17, 2021.
Search Report for Taiwanese Application No. 109106896 dated Mar. 30, 2021.

* cited by examiner

METHOD AND SYSTEM FOR ACTIVE RISK CONTROL BASED ON INTELLIGENT INTERACTION

CROSS-REFERENCE TO RELATED APPLICATIONS

This application is a continuation application of International Patent Application No. PCT/CN2020/071590, filed on Jan. 11, 2020, which claims priority to and benefits of the Chinese Patent Application No. 201910726858.9, filed on Aug. 7, 2019. The contents of the above-referenced applications are incorporated herein by reference in their entirety.

TECHNICAL FIELD

The specification generally relates to risk control, and more particularly to active risk control.

BACKGROUND

As the Internet gradually penetrates all aspects of people's lives, the extent and types of risks faced by users are constantly increasing. Among these risks, the most prominent is illegal embezzlement of users' funds. At present, third-party payment is booming with increasingly easier transaction processes, while people's awareness of risk prevention has not increased along with such development, eventually manifesting as frequent occurrence of fraud cases.

With traditional risk control solutions, an in-depth analysis is performed on the cases that have occurred to obtain the phone numbers and the methods used to commit the crimes, and then risk control is performed based on these characteristics. From the perspective of user protection, the users have been damaged, and losses have been caused at this point, which greatly impacts user experience. An analysis of current risks has shown that third-party payment is a channel for fund transfer in the entire risk process and that risks occur mainly outside the payment process. At the same time, the receivers of the transferred funds, i.e., the media receiving the funds, are mostly of new types and cannot be identified by traditional risk control solutions before an actual fraud occurs.

In this field, an efficient method and system for risk control based on intelligent interaction may be required and they may be able to identify risk implementers in time before risks occur, thereby reducing the efficiency of risk implementers and the possibility of user losses.

SUMMARY OF THE INVENTION

To address the technical problem, the specification provides an efficient solution for active risk control based on intelligent interaction. The solution can take the initiative to identify risks beforehand. The solution also features intelligent interaction and uses a model of intelligent interaction in place of humans to actively communicate with risk implementers through various contact methods, providing high-efficiency operation around the clock. At the same time, the design of interactive proxies makes it possible to infinitely expand the machine's capacity for parallel tasks to increase processing throughput. With this solution, risk control automation is also possible. Based on the obtained risk media and risk processes, subsequent processing platforms may be automatically activated, and related decision-making actions may be automatically deployed, thereby greatly improving the effects of risk prevention.

One embodiment of the specification provides an intelligent interaction-based risk control method, comprising: acquiring contact information of a risk implementer; performing, based on the contact information, active interaction with the risk implementer to generate a record of the active interaction; processing the record of the active interaction to extract risk characteristics; categorizing risks based on the extracted risk characteristics; implementing, based on the categorized risks, different risk controls on the risks.

In some embodiments, acquiring contact information of the risk implementer further comprises: collecting raw data related to the risk; performing a semantic analysis of the raw data to generate a semantic analysis result; determining, based on the semantic analysis result, processing priority; and extracting, according to the determined processing priority, the contact information of the risk implementer.

In yet another embodiment, the contact information of a risk implementer includes a telephone number, an instant messaging account, a web release account, or an email address.

In some embodiments, the performing, based on the contact information, active interaction with the risk implementer comprises: actively contacting, based on the contact information, the risk implementer; receiving information from the risk implementer; analyzing the information from the risk implementer to identify an interaction topic; identifying, based on the interaction topic, intention of the risk implementer; and automatically generating, based on the intention of the risk implementer, a response.

In another some embodiments, the performing, based on the contact information, active interaction with the risk implementer is performed through an interactive proxy.

In some embodiments, the processing the record of the active interaction to extract risk characteristics comprises: performing a multimedia format conversion of the record of the active interaction; performing a semantic analysis on the converted record of the active interaction; and investigating, based on the performed semantic analysis, a risk process to extract the risk characteristics.

In some embodiments, the risk characteristics include a medium characteristic, a behavior characteristic, a time characteristic, or a geographical characteristic.

One embodiment of the specification provides an active risk control system based on intelligent interaction, comprising: one or more processors, a memory storing instructions that, when executed by the one or more processors, causes the system to perform: acquiring contact information of a risk implementer; performing, based on the contact information, active interaction with the risk implementer to generate a record of the active interaction; processing the record of the active interaction to extract risk characteristics; categorizing risks based on the extracted risk characteristics; implementing, based on the categorized risks, different risk controls on the risks One embodiment of the specification provides an acquisition module to acquire contact information of a risk implementer; an active interaction module to perform, based on the contact information, active interaction with the risk implementer to generate a record of the active interaction; a characteristic extracting module to process the record of the active interaction to extract risk characteristics; and a categorization control module to categorize the risks based on the extracted risk characteristics.

In another embodiment, the acquisition module acquiring the contact information of the risk implementer further comprises: collecting raw data related to risks; performing a semantic analysis of the raw data to generate a semantic analysis result; determining, based on the semantic analysis result, processing priority; and extracting, according to the determined processing priority, contact information of a risk implementer.

In yet another embodiment, the contact information of the risk implementer includes a telephone number, an instant messaging account, a web release account, or an email address.

In still another embodiment, the active interaction module that actively interacts with the risk implementer based on the contact information further comprises: actively contacting, based on the contact information, the risk implementer; receiving information from the risk implementer; analyzing the information from the risk implementer to identify an interaction topic; identifying, based on the interaction topic, intention of the risk implementer; and automatically generating, based on the intention of the risk implementer, a response.

In another embodiment, the active interaction by the active interaction module with the risk implementer based on the contact information is performed through an interactive proxy in the active interaction module.

In yet another embodiment, the characteristics extraction module that processes the active interaction record and extracts the risk characteristics further comprises: performing a multimedia format conversion of the record of the active interaction; performing a semantic analysis on the converted record of the active interaction; and investigating, based on the performed semantic analysis, a risk process to extract the risk characteristics.

In another embodiment, the risk characteristics include a medium characteristic, a behavior characteristic, a time characteristic, or a geographical characteristic.

One embodiment of the specification provides a non-transitory computer-readable storage medium configured with instructions executable by one or more processors to cause the one or more processors to perform operations comprising: acquiring contact information of a risk implementer; performing, based on the contact information, active interaction with the risk implementer to generate a record of the active interaction; processing the record of the active interaction to extract risk characteristics; categorizing risks based on the extracted risk characteristics; and implementing, based on the categorized risks, different risk controls on the risks.

The summary is provided to introduce some of the concepts in a simplified manner that are further described below in the detailed specification. The summary is not intended to identify the key features or essential features of the subject matter of the claims, nor is it intended to be used to limit the scope of the subject matter of the claims.

BRIEF DESCRIPTION OF THE DRAWINGS

The above summary of the invention and the following specific embodiments will be better understood when read in conjunction with the appended drawings. The drawings are only examples of the specification defined by the claims. In the drawings, the same reference numerals denote the same or similar elements.

DETAILED DESCRIPTION OF THE EMBODIMENTS

Figure 1:
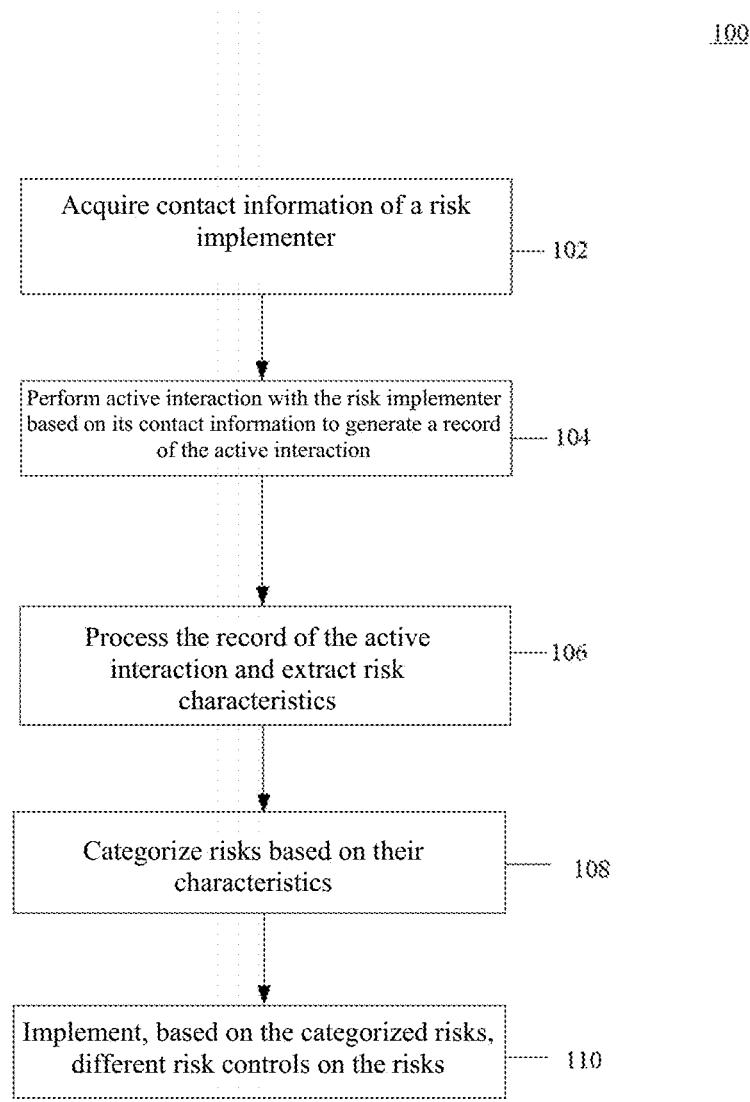
FIG. 1 shows a flow chart of an intelligent interaction-based active risk control method according to one embodiment of the specification.

To make it easier to understand the purposes, features, and benefits of the specification mentioned above, specific embodiments are given below with reference to the appended drawings.

Many specific details are given in the following description to facilitate understanding of the specification, but the specification may also be implemented in other ways than described herein, and therefore is not limited by the specific embodiments disclosed below.

Internet financial service models have become increasingly diversified with the rapid development of technologies such as mobile Internet and virtual reality in recent years. More and more online transactions through virtual networks have started to show characteristics of the least interaction and the most customized communication. While enjoying flexible and convenient services, customers are exposed to risks of a more hidden and professional nature, and more methods and forms of crimes have been developed. The risk of fraud refers to the use of third-party identities, false credentials and information to maliciously defraud by an organized team. The targets include users, financial institutions such as banks, platforms such as apps, etc.

In the case where the target is the users, cybercrimes, from the perspective of activity patterns, may be categorized as telecommunication crimes and online pyramid selling crimes. The former refers to the activities of criminals using telephones, text messages, and the Internet to fabricate false information, set up traps, and perform remote non-contact frauds on victims. The latter refers to criminal pyramid selling activities by means of the Internet. Compared with telecommunication crimes, this type is more hidden, and criminals take advantage of people's greediness to quickly expand the referral pool to prey on large numbers of extensive victims, which often causes serious impacts on the society.

Traditional risk prevention and control is usually performed in a passive and manual manner. When done manually, risk control involves manually identifying and summarizing the risks that have occurred, relying on expert rules, blacklists, etc. This requires accumulation of relevant experience, and long-time efficient operation cannot be maintained. In the process of fighting risk implementers, this puts people in passive defense and shows low timeliness. With passive risk control, cases that have occurred are generally analyzed comprehensively before risk control is deployed into real-time prevention and control systems. At this point, the targeted frauds have been successfully implemented, the users have suffered monetary losses, and the media (e.g., accounts or account numbers, mobile phone numbers, etc. used for the frauds) are short-lived and can be easily destroyed or abandoned. Obviously, such methods are no longer effective for the new risks.

The specification provides a solution for active risk control based on intelligent interaction. Communication is a starting point of all risky behaviors. Currently common communication channels are telecommunications by telephone calls or text messages, and online interaction based on instant messaging accounts, web release accounts and email addresses. Therefore, the communication requires the contact information of the other party. Through active identification of risk data, the contact information of risk implementers is discovered, and then active interaction is initiated. A record of the interaction process may be used to identify the key behavior characteristics, and thus common fraud methods can be identified, and new methods can be distinguished in time. Finally, based on these common and new fraud methods, proper actions and strategies for risk prevention and control may be deployed.

A detailed description will be given below of a scenario where a user is targeted by a telecommunication crime. However, those skilled in the art could understand that the technical solution of the specification is also applicable to criminal activities involving online pyramid selling, frauds targeting financial institutions such as banks and insurers, frauds targeting platforms such as APPs, and frauds in other scenarios.

A detailed description will be given below of the method and system for active risk control based on intelligent interaction according to various embodiments of the specification with reference to the appended drawings.

An Active Risk Control Method Based on Intelligent Interaction

FIG. 1 shows a flow chart of an intelligent interaction-based active risk control method 100 according to one embodiment of the specification.

At 102, contact information of a risk implementer is acquired.

If the risk implementer targets a user, a certain means needs to be used to communicate with the user to achieve the purpose of illegally possessing the victim's money, and thus communication is a starting point of all risk behaviors.

For example, in recent years, telecommunication frauds have taken numerous forms, including those related to wealth management (e.g., false prize winnings, awards, and refunds; securities related frauds; credit card related frauds; insurance related frauds; deposit related frauds, etc.), lottery related frauds, false recruitment/part-time employment related frauds, identity theft-related frauds, false shopping related frauds, online gaming transactions related frauds, virtual product related frauds, etc.

Under normal circumstances, risk implementers will release their contact information in public places and wait for users to contact them. In terms of the behaviors of telecommunication frauds, the contact information of a risk implementer includes a telephone number, an instant messaging account, a web release account, an email address, etc. Those skilled in the art could understand that it is possible for risk implementers to adopt any other contact methods, that they may certainly choose new or more advanced contact methods with the advancement of the Internet and communication technology, and that these contact methods are also included in the technical solution of the specification.

In some embodiments, a crawler tool is used to collect contact information of potential risk implementers. The crawler tool actively collects and investigates in open networks (such as forums, advertising networks, classified information websites, etc.) to form a collection of potentially risky contact information (including a collection of, e.g., phone numbers, instant messaging accounts, web release accounts, email addresses, etc.). Through the crawler tool, suspected risky contact information may be regularly collected at various public places according to certain risk identification rules and contact information collection rules. The raw data collected by the crawler tool may be exported for further analysis.

In some embodiments, a database of suspected risk implementers provided by a third party may be used. Those skilled in the art could understand that various methods can be used to collect contact information of potential risk implementers, and that the description of the above two embodiments do not constitute a limitation on the technical solution of the specification.

Further, when risk implementers release their contact information in public places, the released content often contains other valuable information, such as sensitive words including 'winning prizes', 'award', 'refund', 'recruitment', 'part-time job', etc., or suspicious links. Unprocessed raw data collected or acquired may be processed to extract contact information of potential risk implementers. The process will be described below with reference to the schematic diagram of FIG. 2 and the flow chart of FIG. 3.

At 104, active interaction is performed with a risk implementer based on the contact information and a record of the active interaction is generated.

Based on the contact information of the risk implementer, a robot may initiate large-scale intelligence work. In one embodiment, the robot is an interactive proxy, and the backend is connected to a corresponding intelligent interaction model. Those skilled in the art could understand that the robot is an entity that initiates the intelligence work and may have various implementations. A description will be given below taking an interactive proxy and an intelligent interaction model as examples.

The interactive proxy establishes an information channel between the intelligent interaction model and the risk implementer and is the message transfer node. The intelligent interaction model features automatic interaction, during which it will not be recognized as a machine by the other party. It supports targeted conversation for specific scenarios to obtain the desired risk information. The interactive proxy supports different roles through parameter settings. The intelligent interaction model comprises three parts including understanding the interaction topic, confirming the other party's intention, and automatically generating responses. It mainly consists of two models including an interaction intention understanding model that can understand the information from a risk implementer and obtain its intention, and a response generation model that generates proper responses based on the intention.

Through the interactive proxy and the intelligent interaction model, active interaction with risk implementers may be performed based on the contact information of the risk implementers. The process will be described below with reference to the schematic diagram of FIG. 4 and the flow chart of FIG. 5. The active interaction with the risk implementer is recorded and saved as a record of the active interaction.

At 106, the record of the active interaction is processed to extract risk characteristics.

The record of the active interaction usually includes a complete risk process, from which valuable risk data may be found and the key points and major methods of operation may be summarized. It is the basis for subsequent risk analysis and prevention. Processing of the record of the active interaction may involve uniform format conversion, semantic interpretation of the interaction process, and risk process investigating. Through investigating a risk process, the risk characteristics related to the risk scenario will be obtained. The risk characteristics include a medium characteristic, a behavior characteristic, a time characteristic, a geographical characteristic, etc. Those skilled in the art could understand that different medium, behavior, time, and geographical characteristics may be extracted for different risk scenarios, and that other risk characteristics may also be provided.

The specific process of processing the record of the active interaction and extracting risk characteristics will be described below with reference to the schematic diagram of FIG. 6 and the flow chart of FIG. 7.

At 108, risks are categorized based on their risk characteristics. As far as telecommunication frauds are concerned, risks may be either internal or external. External risks mainly include attack on a target, attack on a third-party, and money laundry, while internal risks mainly include unauthorized actions and attacks.

According to the extracted risk characteristics, risks can be categorized. The time and geographical characteristics are usually used in combination with the behavior and medium characteristics to categorize risks. The medium characteristic of risks describes the tools and channels used by a risk implementer to communicate with users and transfer funds during the risk process. The behavior characteristic describes the set of behaviors of the risk implementer that are different from normal behaviors to a certain degree during the risk process. A risk is categorized as internal when each risk characteristic indicates that the risk occurs inside the system; while it is categorized as external when each risk characteristic indicates that the risk occurs outside the system. The process of categorizing risks according to their characteristics will be described below with specific examples.

At 110, different risk controls are implemented based on the risks.

For internal risks, a targeted protection system is established based on different risk characteristics. For example, further risk control can be deployed at different levels within the system. At the external channel level, customer access and suspicious behaviors before transactions, and whether a party in a transaction is on a suspect list are further monitored. Business violations and suspicious operations at the internal channel level are monitored. Fraudulent transactions within products and services and cross-product fraudulent transactions are monitored at the product and service level. Cross-product/channel combinations/complex fraudulent transactions are monitored at the data integration level.

For external risks, since some data cannot be processed independently in this system, the risk data are output to provide external risk services. For example, suspicious phone numbers are pushed to telecommunications operators, suspicious bank cards/accounts are pushed to relevant banks, etc.

Figure 2:
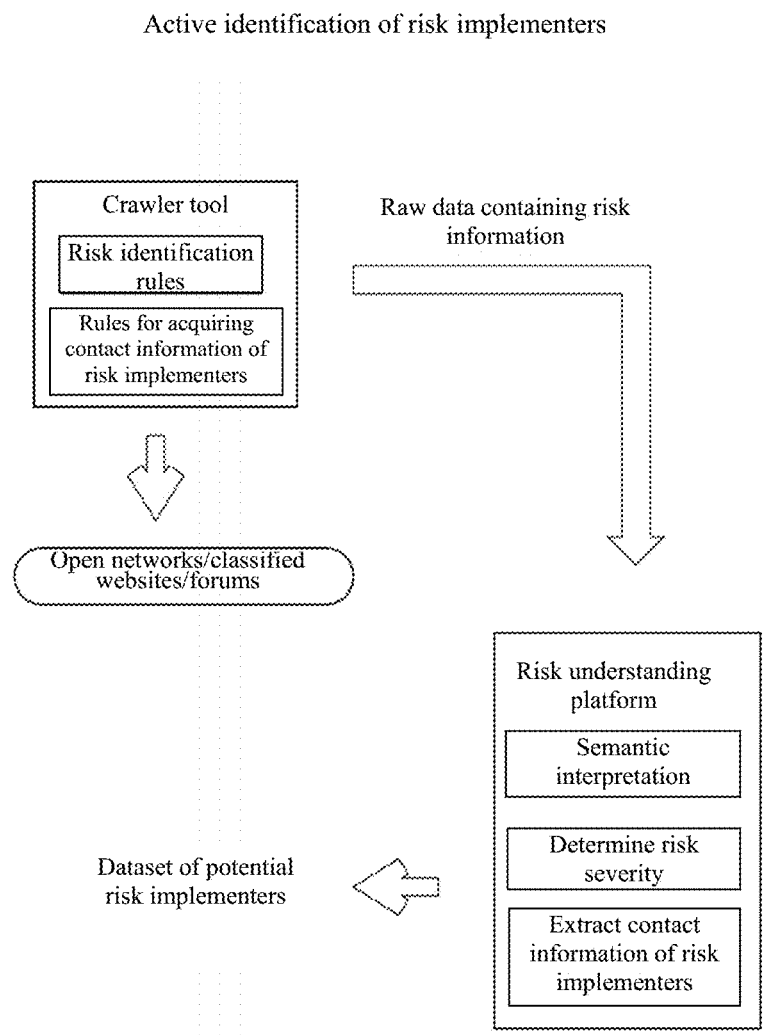
FIG. 2 is a schematic diagram illustrating a process of acquiring contact information of a potential risk implementer according to one embodiment of the specification.

FIG. 2 is a schematic diagram illustrating the process of acquiring contact information of a potential risk implementer according to one embodiment of the specification. The process of acquiring contact information of potential risk implementers is in fact a process to actively identify risk implementers.

Before a fraud is implemented on a user, a certain means needs to be used to communicate with the user to further achieve the purpose of illegally possessing the victim's money, and thus communication is a starting point of all risk behaviors. At present, common communication channels include phone calls or text messages, texts, pictures, videos, etc. through an instant messaging account, interaction through a web release account, links sent via emails, etc. Therefore, the contact information of the other party is necessary to establish communication. Through active identification of risk data, the contact information of risk implementers is investigated, thus providing a data basis for active interaction.

In some embodiments, a crawler tool may be used to collect risk data. The crawler tool actively collects and investigates in open networks (such as forums, advertising networks, classified information websites, etc.) to form a collection of potentially risky contact information. Under normal circumstances, risk implementers will release their contact information in public places and wait for users to contact them. Through the crawler tool, suspected risky contact information may be regularly collected at various public places according to risk identification rules and contact information collection rules. The data collected by the crawler tool are unprocessed raw data and are exported to a risk interpretation platform for further analysis. Other tools may also be used to collect risk data. In some embodiments, a database of suspected risk implementers provided by a third party may be used. Those skilled in the art could understand that various methods can be used to collect contact information of potential risk implementers, and that the description of the above two embodiments do not constitute a limitation on the technical solution of the specification.

Risk identification rules and contact information collection rules can be set in advance or be learned and accumulated gradually. Risk identification rules and contact information collection rules can be simple rules, rule sets, rule trees, rule flows, etc., or even recognition engines that incorporate natural language models and deep learning algorithms, to identify risks in different scenarios and collect corresponding raw data containing risk information.

For example, in the risk identification rules and contact information collection rules of telecommunication frauds, keywords may be set related to telecommunication frauds such as keywords related to wealth management (e.g., false prize winnings, awards, and refunds; securities related frauds; credit card related frauds; insurance related frauds; deposit related frauds, etc.), lottery related frauds, false recruitment/part-time employment related frauds, identity theft related frauds, false shopping related frauds, online gaming transaction related frauds, virtual product related frauds, etc., and rules may be established accordingly and dynamically updated with changes in fraudulent telecommunication behaviors.

In some embodiments, the crawler tool finds a web release account that publishes information about a potentially false award for students in college entrance examinations in a certain location. For example, the information states that students who receive a college admission notice will receive a grant of RMB 2,800 in a lump sum, and a phone number is provided for eligible students to call or send text messages. The crawler tool collects raw data including the web release account, phone number, conditions for obtaining the "grant or scholarship" and "amount of grant or scholarship" based on the keyword "grant or scholarship". A risk interpretation platform is used to process the raw data collected by the crawler tool. For the craw data containing risk information, it may perform semantic interpretation, risk severity determination, and extraction of contact information of the risk implementer. With the semantic interpretation, a semantic analysis is performed on the raw data collected by the crawler tool, to generate a semantic analysis result. According to the natural language understanding model and the parameters and thresholds designed with it, it is determined whether they are risk data, and the data are preprocessed by word segmentation and theme feature analysis.

The semantic interpretation function semantically analyzes the collected information "students who receive a college admission notice will receive a grant of RMB 2,800 in a lump sum", and understands the existence of a condition, i.e., "students who receive a college admission notice" based on the natural language understanding model. Further, it is confirmed that the data may be risk data, and the risk data are preprocessed to extract information such as a web release account, a telephone number, an organization offering the "grant or scholarship", a condition for receiving the "grant or scholarship", and an "amount of grant or scholarship". Then different contact methods are marked based on the semantic interpretation, such as telephone calls, text messages, interaction through an instant messaging application, etc., and a possible type of fraud is determined, for example, a false award targeting students who do not have financial independence. At this point, the risk severity is determined based on the semantic interpretation and the possible type of fraud, and the extent of harm that the risk may cause is determined. The risk severity increases from level 1 to level 5 and is used as a basis for the priority in subsequent processing. According to the extent of possible harm, the contact information of risk implementers is extracted based on the priority, and valuable information in the risk data is extracted, including the contact information of the other party. A set of potential risk implementers is thus formed.

Figure 3:
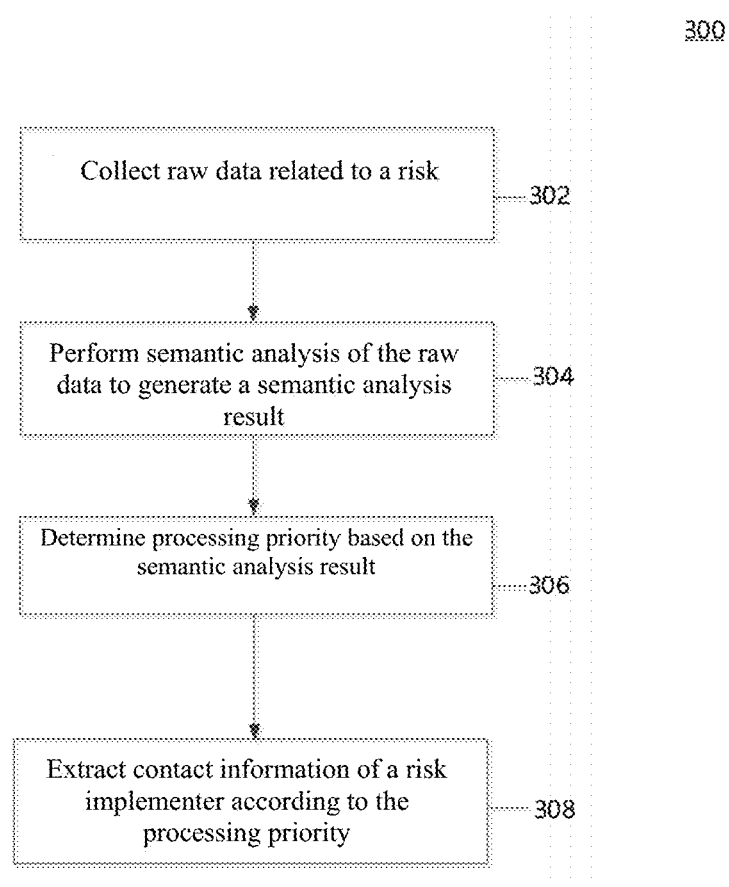
FIG. 3 is a flow chart illustrating the process of acquiring contact information of a potential risk implementer according to one embodiment of the specification.

FIG. 3 is a flow chart illustrating the process of acquiring contact information of a potential risk implementer according to one embodiment of the specification.

At 302, raw data related to a risk is collected.

In the embodiment of the false award, the crawler tool collects the raw data including the web release account, phone number, organization offering the "grant or scholarship", condition for receiving the "grant or scholarship" and "amount of grant or scholarship" based on the keyword "grant or scholarship".

At 304, a semantic analysis is performed on the raw data to generate a semantic analysis result.

In the embodiment of the false award, the semantic interpretation function semantically analyzes the collected information "students who receive a college admission notice will receive a grant of RMB 2,800 in a lump sum", and understands the existence of a condition, i.e., "students who receive a college admission notice" based on the natural language understanding model. Further, based on the condition "students who receive a college admission notice", the number of eligible students in that year at that location may be estimated, or the data may be extracted, and the total amount may be estimated. The financial status of the funding organization indicated by the account is checked, and historical data of the funding organization are searched. Then, it is confirmed that the data may be risk data, and the risk data are preprocessed to extract information such as a web release account, a telephone number, an organization offering the "grant or scholarship", a condition for receiving the "grant or scholarship", and an "amount of grant or scholarship".

At 306, risk severity and priority are determined based on the semantic analysis result.

Based on the result of the semantic analysis, different contact methods are marked, such as telephone calls, text messages, interaction through an instant messaging application, etc., and the possible type of fraud is determined, for example, a false award targeting students without economic independence. At this point, the risk severity and the possible type of fraud are determined based on the semantic interpretation, and the extent of harm that the risk may cause is determined. The risk severity increases from level 1 to level 5 and is used as a basis for the priority in subsequent processing. For example, in the embodiment of the false award, the risk severity is marked as level 4. Those skilled in the art could certainly understand that the determination of risk severity may differ with different risk control systems, and it suffices that it can be used as the priority basis for subsequent processing.

At 308, the contact information of the risk implementer is extracted according to the determined processing priority.

According to the degree of possible harm, the contact information of the risk implementers is extracted based on the priority, and valuable information in the risk data is extracted, including the original release channel, contact information of the other party, possible type of the fraud, etc. A dataset of potential risk implementers is thus formed. This dataset of potential risk implementers may be stored as structured data.

Figure 4:
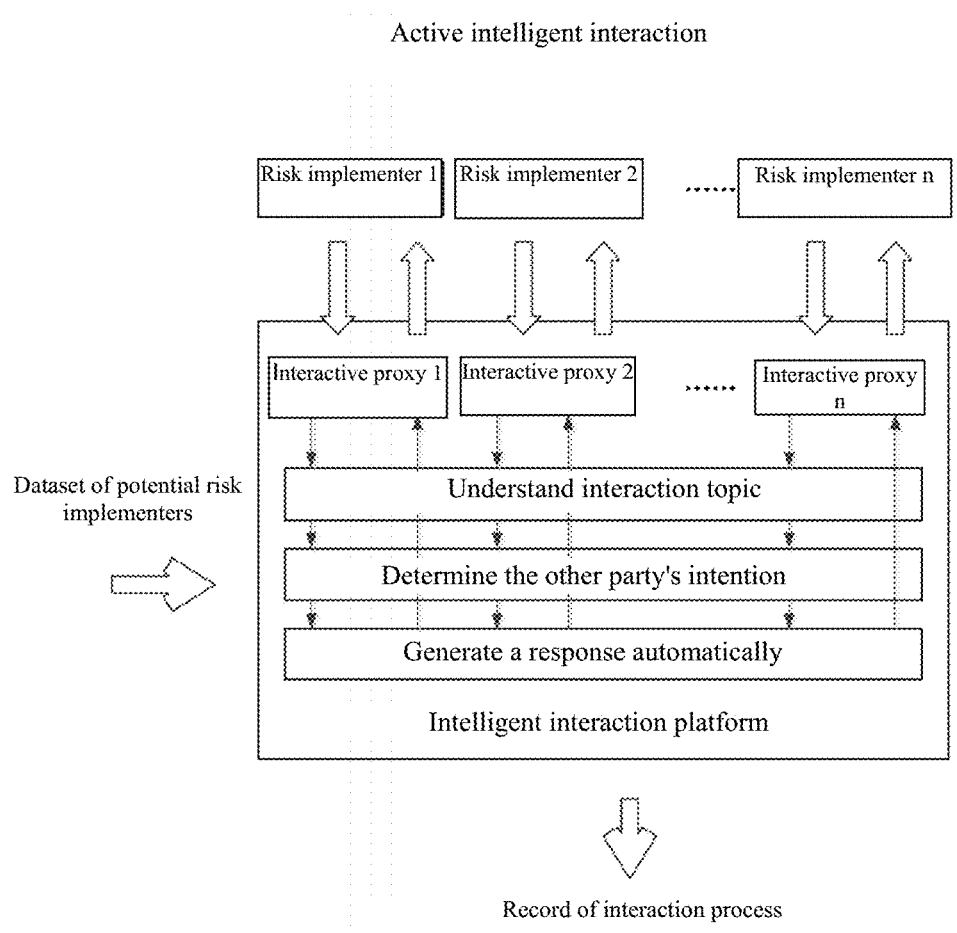
FIG. 4 is a schematic diagram illustrating a process of active interaction with a potential risk implementer according to one embodiment of the specification.

FIG. 4 is a schematic diagram illustrating a process of active interaction with a potential risk implementer according to one embodiment of the specification.

The process of active interaction with potential risk implementers is mainly performed by an intelligent interaction platform. The intelligent interaction platform is responsible for managing all interaction processes, and multiple interactive proxies may be deployed on the platform. The platform allocates risks to different interactive proxies according to the different types of fraud, and at the same time uses the corresponding data of a potential risk implementer as input to an interactive proxy. The platform automatically controls the number of proxies working simultaneously and the working hours of each proxy according to the number of tasks to be handled for potential risks and monitors the proxies' operation in real time to generate statistical data. An interactive proxy is an entity that actively contacts with risk implementers and is connected to an intelligent interaction model at the backend. With a specific model connected, the interactive proxy may function for voice communication, text communication, instant messaging, responding to web release, etc., to respectively handle interactions through phone calls, short messages, instant messaging, web release, etc. The interactive proxy, as the message transfer node, establishes an information channel between the intelligent interaction model and the risk implementer. Each interactive proxy can independently complete a task to actively contact a potential risk implementer. Multiple interactive proxies can jointly work on one task to facilitate the communication with a group of potential risk implementers. In terms of processing scale, multiple interactive proxies can be deployed to quickly increase the system's processing throughput.

The intelligent interaction model has functions of automatic interaction. Specifically, it will not be recognized as a machine by the other party in a fraud scenario; it supports targeted conversion to obtain the desired risk information; and it supports different roles through parameter settings. Before or during an active interaction, the intelligent interaction model can prepare relevant data and information for the active interaction based on background data and operation. For example, in the embodiment of the false award, the intelligent interaction model can support different roles such as senior middle school graduates who lack social experience, parents with certain social experience, and teachers with certain social experience, to lead the risk implementor to explain how to obtain the grant and whether it involves some risky operations such as requiring the student to make a money transfer to an account provided before receiving the grant, and lead further to a revelation of information concerning the organization that funds the grant. Based on the fake award information for students in college entrance examinations in a certain place, the intelligent interaction model can also check the total number of students in that place who meet the condition "students who receive a college admission notice", and determine the total amount by multiplying the grant of RMB 2,800 per person by the total number. In this way, information is provided for subsequent active interaction. Based on the information of the funding organization provided by the potential risk implementer, the intelligent interaction model can check its status and use the information in subsequent interactions for verification.

Specifically, in the active interaction with a potential risk implementer, the intelligent interaction model can understand an interaction topic, determine the intention of the other party, and automatically generate responses. Firstly, the interactive topic is understood. After active communication, the voice, texts, pictures, or videos sent by the other party are received and analyzed to understand the topic of the current interaction. Taking the embodiment of the false award as an example, the interaction topic can be understood as the "grant or scholarship" based on the information sent by the other party. Then the intention of the other party is determined. Different expressions from the other party may denote the same thing, and therefore it is necessary to convert the information provided by other party into standard questions, and then identify the other party's intention and understand their purpose. In some embodiments, the other party will certainly interact in different ways with different roles, such as students, parents, and teachers. This can be used to translate their information into answers to standard questions, such as, what is the procedure for obtaining the grant? How many students have received it (or how many students are eligible)? What kind of entity the funding organization is? What conditions do students need to meet or what are expected of them in return?

A response will then be automatically generated. Based on the intention of the other party, a model for generating natural language is used to generate a response corresponding to the specific intention, with tones or expressions of proper characteristics. Texts are generated for interaction by text messages; the content has to be converted to voice files for voice interaction; for interaction by instant messaging, it is necessary to maintain the corresponding features or characteristics in terms of text, voice or emoji, and response speed; for interaction by web release or e-mail with a relatively free writing style, it is necessary to maintain the corresponding writing style. For the entire active interaction, the intelligent interaction platform will record the interaction process, for example, the complete process of the telephone communication between a voice interactive proxy and a potential risk implementer. The record includes a complete risk process, from which valuable risk data may be found and the key points and major methods of operation may be summarized. It is the basis for subsequent risk analysis and prevention.

Figure 5:
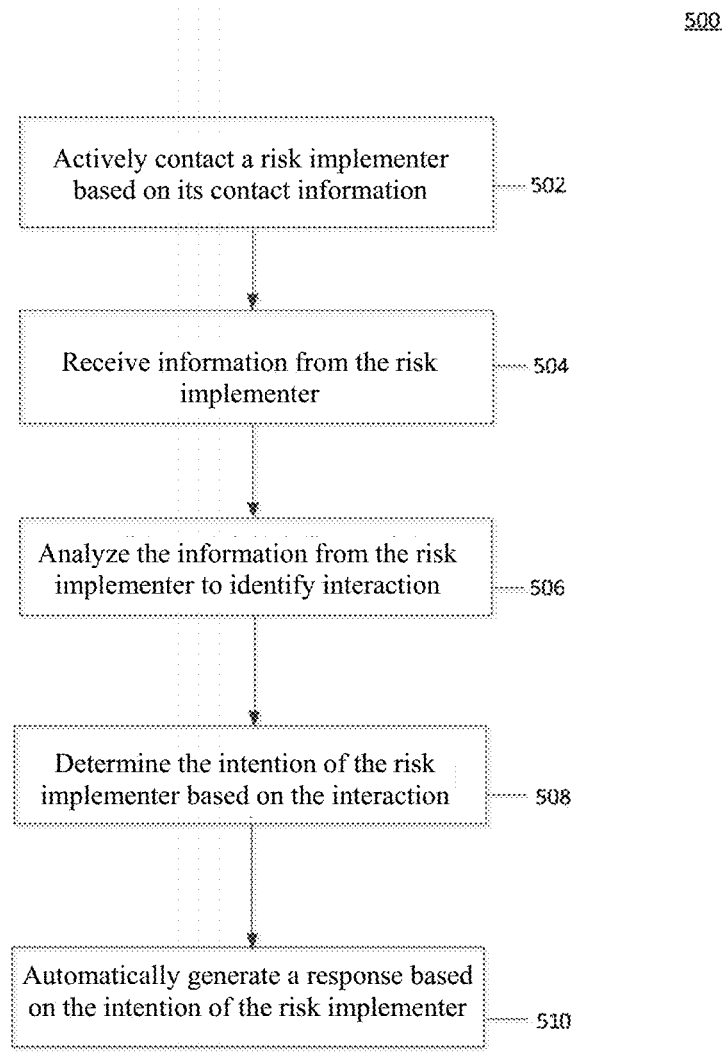
FIG. 5 is the flow chart illustrating the process of active interaction with a potential risk implementer according to one embodiment of the specification.

FIG. 5 is a flow chart illustrating the process of active interaction with a potential risk implementer according to one embodiment of the specification.

At 502, an active contact with a risk implementer is initiated based on the contact information thereof.

A crawler tool finds a network release account that release potential false award information for students in college entrance examinations at a certain location. said the information states that students who receive a college admission notice will receive a grant of RMB 2,800 in a lump sum, and a phone number is provided for eligible students to call or send text messages. Based on this, the intelligent interaction platform can actively contact a risk implementer by phone call or text message based on the contact information thereof. The intelligent interaction platform can perform the active interaction in different roles, such as students, parents, or teachers.

At 504, information is received from the risk implementer.

At 506, the information received from the risk implementer is analyzed to identify an interaction topic.

After receiving the information from the risk implementer, it analyzes the voice, text, picture, or video sent by the other party to understand the current interaction topic.

At 508, the intention of the risk implementer is determined based on the interaction topic.

The intention of the other party can be determined based on the interaction topic. Different expressions from the other party may denote the same thing, and therefore it is necessary to convert the information provided by other party into standard questions, and then identify the other party's intention and understand its purpose.

At 510, a response is automatically generated based on the intention of the risk implementer.

Based on the intention of the other party, a model for generating natural language is used to generate a response corresponding to the specific intention, with tones or expressions of proper characteristics. Texts are generated for interaction by text messages; the content has to be converted to voice files for voice interaction; for interaction by instant messaging, it is necessary to maintain the corresponding features or characteristics in terms of text, voice or emoji, and response speed; for interaction by web release or e-mail with a relatively free writing style, it is necessary to maintain the corresponding writing style.

Figure 6:
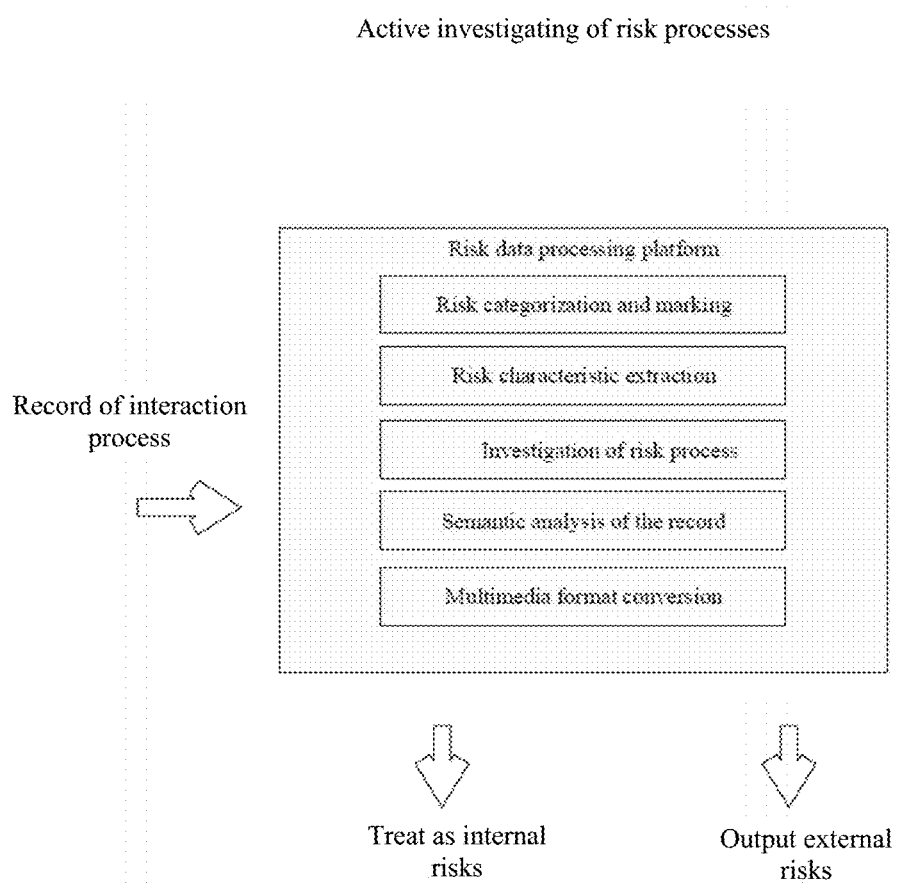
FIG. 6 is a schematic diagram of a process of investigating risk processes and extracting risk characteristics according to one embodiment of the specification.

FIG. 6 is a schematic diagram of the process of investigating risk processes and extracting risk characteristics according to one embodiment of the specification.

The process of investigating risk processes and extracting risk characteristics is performed by a risk data processing platform. For a record of an active interaction process, the risk data processing platform can perform multimedia format conversion, semantic analysis of the record, risk process investigating, risk characteristic extraction, and risk category marking. Conversion of multimedia information to a single format is necessary because the active interaction is made through phone calls, SMS/MMS, instant messaging (including text, voice, video, emoji, etc.) and web release.

For the convenience of subsequent processing, they are all converted to text, including recognition of voice contents and picture contents. For example, in the embodiment of false award, the active interaction by different roles such as students, parents, and teachers supported by the intelligent interaction model is mainly performed by phone calls and text messages. Therefore, the phone voice and text messages will all be converted into text, which includes speech recognition.

Semantic interpretation of an interaction process is performed based on a natural language processing model to facilitate understanding of the risk process. In the embodiment of false award, the interaction topic is "the grant", and therefore the focus will fall on the way to receive the grant, risky operations, for example, requiring a student to transfer money to an account provided, the funding organization, etc. The semantic interpretation is followed by risk process investigating. A risk process may be characterized by a series of behavior points to obtain a set of behavior points to certain extent different from normal behaviors. In the embodiment of the false award, the normal operation may be that the student provides an account number and the transfer is made to the account by the funding organization; therefore, the behavior of the other party requiring a student to transfer money to an account provided during the interaction process will be deemed a risky behavior point. In addition, in the process of active interaction, an answer to a question about the total amount may be at the magnitude as calculated, and a response different from the corresponding magnitude will be deemed a risky behavior point. It could certainly be understood that there are other risky behavior points, which are not described further.

Based on risk process investigating, risk characteristics can be extracted, such as time characteristics, geographical characteristics, behavior characteristics, and medium characteristics. In the embodiment of the false award, the time characteristic is the time chain from the date of the web release to subsequent follow-ups. The geographical characteristic is the area defined in the release. At the same time, a phone number portrait can be made during the interaction process and compared with the defined area in the release. The behavior characteristic is a set of risky behavior points described. The medium characteristic describes the tools and channels used by a risk implementer to communicate with users and transfer funds during the risk process. The bank account or payment APP account provided by the other party is the tool or channel for fund transfer.

Based on its characteristics, a risk can be categorized and marked. A risk is categorized as internal when each risk characteristic indicates that the risk occurs inside the system; while it is categorized as external when each risk characteristic indicates that the risk occurs outside the system. In the embodiment of the false award, the medium characteristic of the risk indicates that the fund transfer channel used by the risk implementer is outside the system, and therefore the risk is categorized as an external risk. The processing of the record of the active interaction enables identification of valuable information points through semantic analysis, and therefore common operation methods can be identified, and new methods can be timely discovered, with key behavioral characteristics identified.

Figure 7:
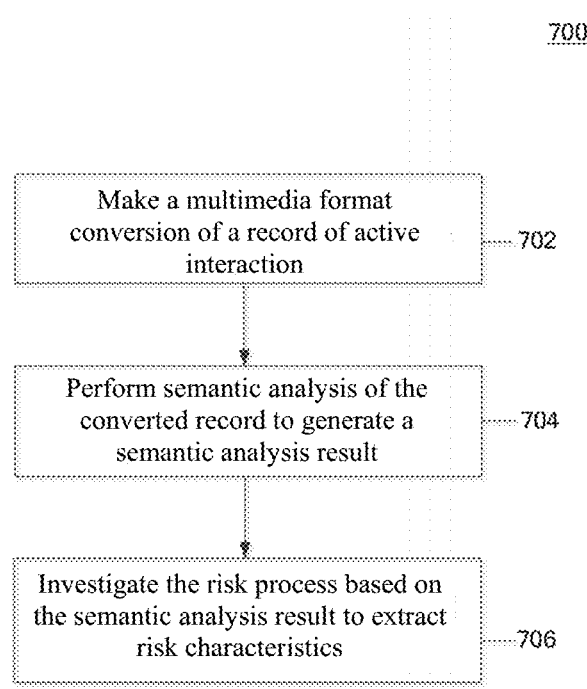
FIG. 7 is the flow chart of the process of investigating risk processes and extracting risk characteristics according to one embodiment of the specification.

FIG. 7 is a schematic diagram of the process 700 of investigating risk processes and extracting risk characteristics according to one embodiment of the specification.

At 702, a record of multimedia active interaction is converted into a single format.

A record of the active interaction is converted into text, including recognition of voice contents and picture contents.

At 704, semantic analysis is performed on the converted record of the active interaction to generate a semantic analysis result.

Semantic interpretation is performed based on a natural language processing model on the converted record of the active interaction to facilitate understanding of the risk process.

At 706, the risk process is investigated based on the semantic analysis result to extract risk characteristics.

A risk process may be characterized by a series of behavior points to obtain a set of behavior points to certain extent different from normal behaviors. Based on risk process investigating, risk characteristics can be extracted, such as medium characteristics, behavior characteristics, time characteristics, and geographical characteristics.

An Active Risk Control System Based on Intelligent Interaction

Figure 8:
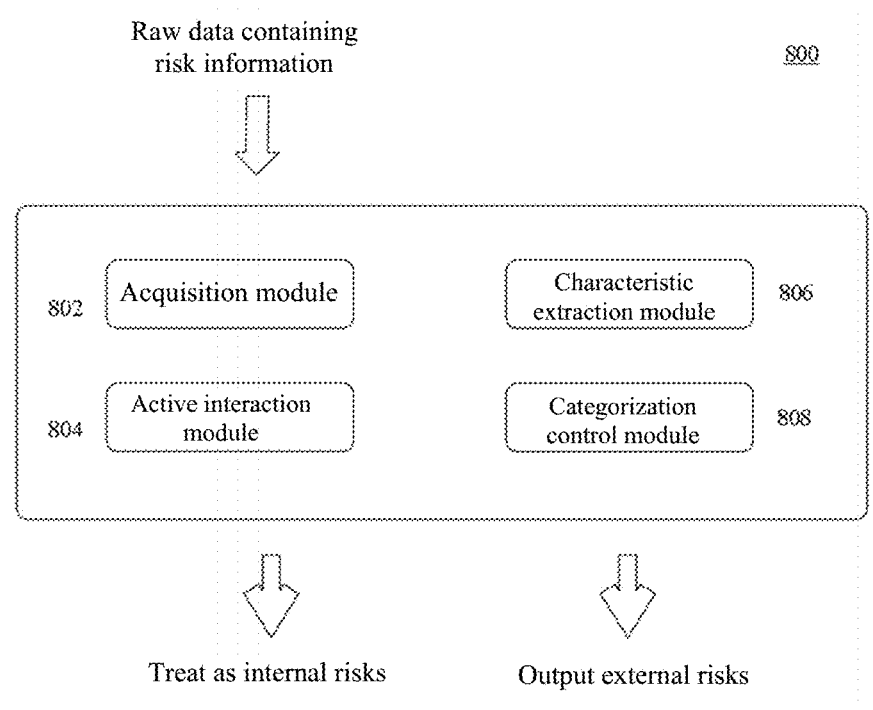
FIG. 8 shows a block diagram of an intelligent interaction-based active risk control system according to one embodiment of the specification.

FIG. 8 shows a block diagram of an intelligent interaction-based active risk control system 800 according to one embodiment of the specification.

The system 800 comprises an acquisition module 802, an active interaction module 804, a characteristic extraction module 806, and a categorization control module 808.

The acquisition module 802 acquires contact information of a risk implementer. If the risk implementer targets a user, a certain means needs to be used to communicate with the user to achieve the purpose of illegally possess the victim's money, and thus communication is a starting point of all risky behaviors.

Under normal circumstances, risk implementers will provide their contact information in public places and wait for users to contact them. In terms of the behaviors of telecommunication fraud, the contact information of a risk implementer includes telephone numbers, instant messaging accounts, web release accounts, email addresses, etc. In some embodiments, a crawler tool is used to collect contact information of potential risk implementers. In some embodiments, a database of suspected risk implementers provided by a third party may be used. Those skilled in the art could understand that various methods can be used to collect contact information of potential risk implementers, and that the description of the above two embodiments do not constitute a limitation on the technical solution of the specification.

The active interaction module 804 performs active interaction with the risk implementer based on the contact information thereof and generates a record of the active interaction. Based on the contact information of the risk implementer, a robot may take large-scale active initiatives. In one embodiment, the active interaction module 804 establishes an information channel between an intelligent interaction model and the risk implementer and is a message transfer node. The intelligent interaction model of the active interaction module 804 features automatic interaction, during which it will not be recognized as a machine by the other party. It supports targeted conversation for specific scenarios to obtain the desired risk information. The interactive proxy supports different roles through parameter settings. The intelligent interaction model comprises three parts, namely understanding the interaction topic, confirmation the other party's intention, and automatically generating responses. It mainly consists of two models, namely, an interaction intention understanding model that can understand the information sent by the risk implementer and obtain their intention, and a response generation model that generates proper responses based on the intention. The active interaction with risk implementers is recorded and saved as a record of the active interaction.

The characteristic extraction module 806 processes the record of the active interaction and extracts risk characteristics.

The record of the active interaction usually includes a complete risk process, from which valuable risk data may be found and the key points and major methods of operation may be summarized. It is the basis for subsequent risk analysis and prevention. Processing of a record of an active interaction may involve uniform format conversion, semantic interpretation of the interaction process, and risk process investigating. Through investigating a risk process, the risk characteristics related to the risk scenario will be obtained. The risk characteristics include a medium characteristic, a behavior characteristic, a time characteristic, a geographical characteristic, etc. Those skilled in the art could understand that different medium, behavior, time, and geographical characteristics may be extracted for different risk scenarios, and that other risk characteristics may also be provided.

The categorization control module 808 categorizes risks based on their characteristics. According to the extracted risk characteristics, risks can be categorized. The time and geographical characteristics are usually used in combination with the behavior and medium characteristics to categorize risks. The medium characteristic of risks describes the tools and channels used by a risk implementer to communicate with users and transfer funds during the risk process. The behavior characteristic describes the set of behaviors of risk implementers that are different from normal behaviors to a certain extent during the risk process. A risk is categorized as internal when each risk characteristic indicates that the risk occurs inside the system; while it is categorized as external when each risk characteristic indicates that the risk occurs outside the system.

Further, the categorization control module 808 implements different risk controls based on the risks. For internal risks, a targeted protection system is established based on different risk characteristics. For external risks, since some data cannot be processed independently in this system, the risk data are output to provide external risk services.

The specification provides a solution for active risk control based on intelligent interaction, which can take the initiative and identify risks before loss is caused. Traditionally, risk information is obtained through user reports, i.e., after the event occurs. At the same time, the media which has been successfully used in the fraud has a very short life cycle and is difficult to play a significant role in the subsequent prevention and control. However, the technical solution of the specification can acquire relevant information before a fraud occurs through active interaction, i.e., providing prevention and control before any actual loss is caused.

The solution also features intelligent interaction. A model of intelligent interaction is used in place of humans to actively communicate with risk implementers through various contact methods, providing high-efficiency operation around the clock. At the same time, the design of interactive proxies makes it possible to infinitely expand the machine's capacity for parallel tasks to increase processing throughput. With this solution, risk control automation is also possible. Based on the obtained risk media and risk processes, subsequent processing platforms may be automatically activated, and related decision-making actions may be automatically deployed, thereby greatly improving the effects of risk prevention.

Each step and module of the active risk control process and system based on intelligent interaction described above may be implemented by hardware, software, or a combination thereof. If hardware is used, general-purpose processors, digital signal processors (DSPs), application-specific integrated circuits (ASICs), field-programmable gate arrays (FPGAs), or other programmable logic devices, hardware components, or any combination thereof may be used to implement or execute the illustrative steps, modules and circuits described in connection with the specification. A general-purpose processor may be a processor, a microprocessor, a controller, a microcontroller, or a state machine. If software is used, the various illustrative steps and modules described in connection with the specification may be stored or transmitted as one or more instructions or codes on a computer-readable medium. Software modules that implement various operations of the specification may reside in storage media such as RAM, flash memory, ROM, EPROM, EEPROM, registers, hard disks, removable disks, CD-ROMs, cloud storage, etc. The storage medium may be coupled to a processor so that the processor can read and write information from/to the storage medium and execute corresponding program modules to implement the steps of the specification. Moreover, software-based embodiments may be uploaded, downloaded, or accessed remotely by appropriate communication means. Such appropriate means of communication include, for example, the internet, the World Wide Web, intranets, software applications, cables (including fiber optic cables), magnetic communications, electromagnetic communications (including RF, microwave, and infrared communications), electronic communications, or other such communication means.

These embodiments may be described as a process that is depicted as a flowchart, a flow diagram, a structure diagram, or a block diagram. Although flowcharts may describe operations as sequential processes, many of these operations can be performed in parallel or concurrently. In addition, the sequence of these operations may be rearranged.

The disclosed process, devices, and system may not be limited in any way. On the contrary, the invention covers all novel and non-obvious features and aspects of the various disclosed embodiments (individually and in various combinations and sub-combinations). The disclosed process, devices, and system are not limited to any particular aspect or feature or combination thereof, and any disclosed embodiment does not require the existence of any one or more specific benefit or address a specific or all technical problems.

The embodiments of the specification have been described above with reference to the appended drawings, but the specification is not limited to the specific implementations above, which are only schematic but not restrictive. Those ordinarily skilled in the art may make many changes with the motivation provided by the specification but without departing from the purpose and the scope of the claims hereof, and these all fall within the claims of the specification.

What is claimed is:

1. A risk control method, comprising:
    collecting raw data related to risks;
    performing a semantic analysis of the raw data to generate a semantic analysis result indicating a level of risk severity of the raw data;
    determining, based on the semantic analysis result, processing priority among the raw data based on the level of risk severity;

extracting, according to the determined processing priority, contact information of a risk implementer;
performing, based on the contact information, an active interaction with the risk implementer to generate a record of the active interaction, wherein the performing the active interaction with the risk implementer comprises:
sending an interactive message, based on the contact information, to the risk implementer to induce the risk implementer to provide a response;
receiving the response from the risk implementer;
analyzing the response from the risk implementer to identify an interaction topic;
identifying, based on the interaction topic, an intention of the risk implementer;
selecting a predetermined role player based on the interaction topic; and
automatically generating, based on the intention of the risk implementer and the selected role player, a reply message of natural language to the response from the risk implementer, wherein the reply message maintains a style corresponding to a style of the interactive message;
processing the record of the active interaction to extract risk characteristics;
categorizing the risks based on the extracted risk characteristics; and
implementing, based on the categorized risks, different risk controls on the risks.

2. The method according to claim 1, wherein the contact information of the risk implementer includes a telephone number, an instant messaging account, a web release account, or an email address.

3. The method according to claim 2, further comprising:
determining a form for the interactive message based on a type of the contact information of the risk implementer.

4. The method according to claim 3, wherein the form for the interactive message is determined to be a voice message when the type of the contact information of the risk implementer is a telephone number.

5. The method according to claim 1, wherein the performing, based on the contact information, active interaction with the risk implementer is performed through an interactive proxy.

6. The method according to claim 1, wherein the processing the record of the active interaction to extract risk characteristics comprises:
performing a multimedia format conversion of the record of the active interaction;
performing a semantic analysis on the converted record of the active interaction; and
investigating, based on the performed semantic analysis, a risk process to extract the risk characteristics.

7. The method according to claim 6, wherein the risk characteristics include a medium characteristic, a behavior characteristic, a time characteristic, or a geographical characteristic.

8. A risk control system, comprising:
one or more processors,
a memory storing instructions executable by the one or more processors to causes the system to perform operations comprising:
collecting raw data related to risks;
performing a semantic analysis of the raw data to generate a semantic analysis result indicating a level of risk severity of the raw data;
determining, based on the semantic analysis result, processing priority among the raw data based on the level of risk severity;
extracting, according to the determined processing priority, contact information of a risk implementer;
performing, based on the contact information, an active interaction with the risk implementer to generate a record of the active interaction, wherein the performing the active interaction with the risk implementer comprises:
sending an interactive message, based on the contact information, to the risk implementer to induce the risk implementer to provide a response;
receiving the response from the risk implementer;
analyzing the response from the risk implementer to identify an interaction topic;
identifying, based on the interaction topic, an intention of the risk implementer;
selecting a predetermined role player based on the interaction topic; and
automatically generating, based on the intention of the risk implementer and the selected role player, a reply message of natural language to the response from the risk implementer, wherein the reply message maintains a style corresponding to a style of the interactive message;
processing the record of the active interaction to extract risk characteristics;
categorizing the risks based on the extracted risk characteristics; and
implementing, based on the categorized risks, different risk controls on the risks.

9. The system according to claim 8, wherein the contact information of the risk implementer includes a telephone number, an instant messaging account, a web release account, or an email address.

10. The system according to claim 9, wherein the one or more processors are configured to perform:
determining a form for the interactive message based on a type of the contact information of the risk implementer.

11. The system according to claim 10, wherein the form for the interactive message is determined to be a voice message when the type of the contact information of the risk implementer is a telephone number.

12. The system according to claim 8, wherein the performing, based on the contact information, active interaction with the risk implementer is performed through an interactive proxy.

13. The system according to claim 8, wherein the processing the record of the active interaction to extract risk characteristics comprises:
performing a multimedia format conversion of the record of the active interaction;
performing a semantic analysis on the converted record of the active interaction; and
investigating, based on the performed semantic analysis, a risk process to extract the risk characteristics.

14. The system according to claim 13, wherein the risk characteristics include a medium characteristic, a behavior characteristic, a time characteristic, or a geographical characteristic.

15. A non-transitory computer-readable storage medium configured with instructions executable by one or more processors to cause the one or more processors to perform operations comprising:
collecting raw data related to risks;

performing a semantic analysis of the raw data to generate a semantic analysis result indicating a level of risk severity of the raw data;
determining, based on the semantic analysis result, processing priority among the raw data based on the level of risk severity;
extracting, according to the determined processing priority, contact information of a risk implementer;
performing, based on the contact information, an active interaction with the risk implementer to generate a record of the active interaction, wherein the performing the active interaction with the risk implementer comprises:
  sending an interactive message, based on the contact information, to the risk implementer to induce the risk implementer to provide a response;
  receiving the response from the risk implementer;
  analyzing the response from the risk implementer to identify an interaction topic;
  identifying, based on the interaction topic, an intention of the risk implementer;
  selecting a predetermined role player based on the interaction topic; and
  automatically generating, based on the intention of the risk implementer and the selected role player, a reply message of natural language to the response from the risk implementer, wherein the reply message maintains a style corresponding to a style of the interactive message;
processing the record of the active interaction to extract risk characteristics;
categorizing the risks based on the extracted risk characteristics; and
implementing, based on the categorized risks, different risk controls on the risks.

16. The non-transitory computer-readable storage medium according to claim 15, wherein the contact information of the risk implementer includes a telephone number, an instant messaging account, a web release account, or an email address.

17. The non-transitory computer-readable storage medium according to claim 16, wherein the instructions further cause the one or more processors to perform:
  determining a form for the interactive message based on a type of the contact information of the risk implementer.

18. The non-transitory computer-readable storage medium according to claim 15, wherein the performing, based on the contact information, active interaction with the risk implementer is performed through an interactive proxy.

19. The non-transitory computer-readable storage medium according to claim 15, wherein the processing the record of the active interaction to extract risk characteristics comprises:
  performing a multimedia format conversion of the record of the active interaction;
  performing a semantic analysis on the converted record of the active interaction; and
  investigating, based on the performed semantic analysis, the risk process to extract risk characteristics.

20. The non-transitory computer-readable storage medium according to claim 19, wherein the risk characteristics include a medium characteristic, a behavior characteristic, a time characteristic, or a geographical characteristic.

* * * * *